(12) United States Patent
Cooper et al.

(10) Patent No.: US 7,219,241 B2
(45) Date of Patent: May 15, 2007

(54) METHOD FOR MANAGING VIRTUAL AND ACTUAL PERFORMANCE STATES OF LOGICAL PROCESSORS IN A MULTITHREADED PROCESSOR USING SYSTEM MANAGEMENT MODE

(75) Inventors: Barnes Cooper, Beaverton, OR (US); Grant H. Kobayashi, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 381 days.

(21) Appl. No.: 10/307,146

(22) Filed: Nov. 30, 2002

(65) Prior Publication Data
US 2004/0107369 A1 Jun. 3, 2004

(51) Int. Cl.
*G06F 1/26* (2006.01)
(52) U.S. Cl. .................................... 713/310; 713/320
(58) Field of Classification Search ............. 713/310, 713/320, 322, 324; 712/217
See application file for complete search history.

(56) References Cited

U.S. PATENT DOCUMENTS

| | | | |
|---|---|---|---|
| 5,021,679 A | 6/1991 | Fairbanks et al. | |
| 5,153,535 A | 10/1992 | Fairbanks et al. | |
| 5,307,003 A | 4/1994 | Fairbanks et al. | |
| 5,502,838 A * | 3/1996 | Kikinis | 713/501 |
| 5,627,412 A | 5/1997 | Beard | |
| 5,724,565 A * | 3/1998 | Dubey et al. | 712/245 |
| 5,752,011 A | 5/1998 | Thomas et al. | |
| 5,812,860 A * | 9/1998 | Horden et al. | 713/322 |
| 5,974,557 A | 10/1999 | Thomas et al. | |
| 6,038,632 A * | 3/2000 | Yamazaki et al. | 710/260 |
| 6,105,142 A | 8/2000 | Goff et al. | 713/324 |
| 6,157,989 A * | 12/2000 | Collins et al. | 711/151 |
| 6,216,235 B1 | 4/2001 | Thomas et al. | |
| 6,314,511 B2 * | 11/2001 | Levy et al. | 712/217 |
| 6,427,211 B2 * | 7/2002 | Watts, Jr. | 713/320 |
| 6,487,668 B2 | 11/2002 | Thomas et al. | |
| 6,564,328 B1 * | 5/2003 | Grochowski et al. | 713/320 |
| 6,704,876 B1 * | 3/2004 | Iacobovici et al. | 713/300 |
| 6,718,474 B1 * | 4/2004 | Somers et al. | 713/322 |
| 6,829,713 B2 * | 12/2004 | Cooper et al. | 713/320 |
| 6,834,353 B2 * | 12/2004 | Smith et al. | 713/320 |
| 6,836,849 B2 * | 12/2004 | Brock et al. | 713/310 |
| 6,895,520 B1 * | 5/2005 | Altmejd et al. | 713/324 |
| 2002/0083353 A1 | 6/2002 | Orenstein et al. | 713/320 |

FOREIGN PATENT DOCUMENTS

WO    WO 99/61991    12/1999

OTHER PUBLICATIONS

Gurindar S. Sohi et al., "Speculative Multithreaded Processors", Apr. 2001, pp. 66-73.*

(Continued)

*Primary Examiner*—Chun Cao
(74) *Attorney, Agent, or Firm*—Cyndi M. Wheeler

(57) ABSTRACT

A power management technique uses system management interrupt (SMI) to manage performance states of logical processors in a physical processor. Each logical processor is associated with a virtual performance state and an actual performance state. A request to retrieve or to change the virtual performance state causes the SMI to be generated. The virtual performance state is a state known to an operating system (OS). The actual performance state is a state that the logical processor is operating at.

10 Claims, 7 Drawing Sheets

OTHER PUBLICATIONS

Gregory T. Byrd et al., "Multithreaded Processor Architectures" IEEE Spectrum, Aug. 1995, pp. 38-46.*

Anant Agarwal, "Performance Tradeoffs in Multithreaded Processors" IEEE Transactyions on Parallel and Distributed Systems, vol. 3n No. 5, Sep. 1992, pp. 525-539.*

"Coordinating Multiple Server Partitions to Enter Power-Save State", XP 00678586, pp. 235-239, vol. 39, No. 06, Jun. 1996, IBM Technical Disclosure Bulletin.

"Advanced Configuration and Power Interface Specification", XP-002323945, pp. i-xviii and 1-232, Revision 2.0a, Mar. 31, 2002.

* cited by examiner

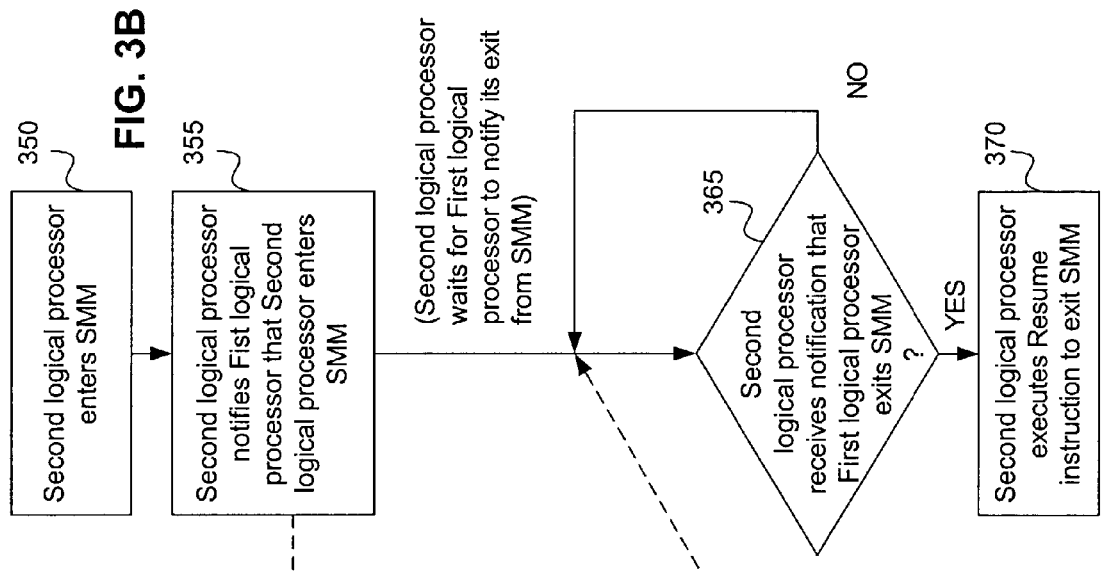
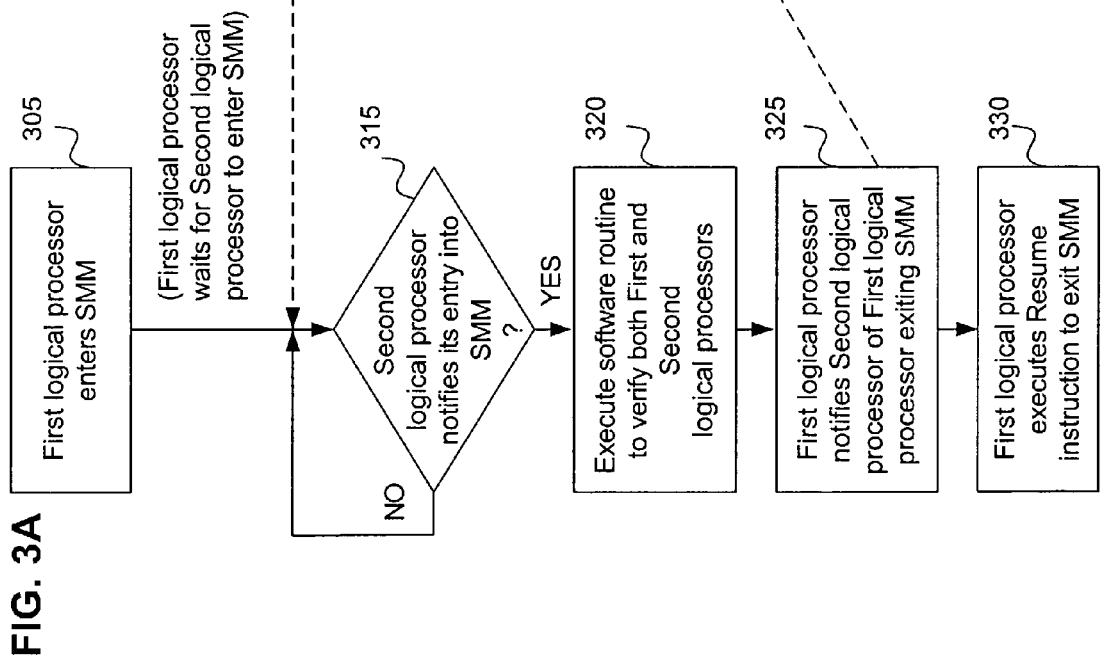
FIG. 3A
FIG. 3B

METHOD FOR MANAGING VIRTUAL AND ACTUAL PERFORMANCE STATES OF LOGICAL PROCESSORS IN A MULTITHREADED PROCESSOR USING SYSTEM MANAGEMENT MODE

FIELD OF THE INVENTION

The present invention relates to the field of computer systems, more particularly relating to methods and apparatuses for power management in computer systems.

BACKGROUND

Computer systems are becoming increasingly pervasive in our society, including everything from small handheld electronic devices, such as personal digital data assistants and cellular phones, to application-specific electronic components, such as set-top boxes and other consumer electronics, to medium-sized mobile and desktop systems to large workstations and servers. To provide more powerful computer systems for consumers, designers strive to continually increase the operating speed of the processor. A by-product of increasing processor speed is an increase in the amount of power consumed. The increased power consumption reduces battery life.

A variety of techniques are known for reducing the power consumption in computer systems. For example, the Advanced Configuration and Power Interface (ACPI) Specification (Rev. 2.0a, Mar. 31, 2002) sets forth information about how to reduce the dynamic power consumption of portable and other computer systems. With respect to processors used in computer systems, different processor power states (or C states) are defined in the ACPI Specification.

Mobile computer systems have historically implemented a variety of C states to save power. C0 is a running state, where the processor is not idle, executing code and performing useful work. When the processor is idle (e.g., not executing any thread), the OS may place the processor into a halt state by issuing a processor halt sequence of instruction. For example, the OS may issue a "STI; HLT" (Enable Interrupts; Halt Processor) instruction sequence to place the processor into a halted state until an unmasked interrupt is registered. In the C1 state, the processor is able to respond to snoop transactions, and wake up very quickly to execute code or service bus master snoop transactions. The processor may progressively cycle through lower states such as C2, C3 and C4 as necessary to save even more power. C2 is a stop grant or mobile "Quick Start" state, where typically clocks are gated off to a large portion of the die. The processor is able to service snoops in the C2 state. The C2 state also supports a fairly low latency exit to allow software to quickly resume execution. C3 is a deep sleep state, where clocks may be gated either internally or externally to the entire processor. In the C3 state, the processor is unable to snoop bus master transactions. Lastly, the C4 state is a variation of the C3 state whereby clocks are stopped and the voltage is reduced to sub-operational levels (voltage sufficient only to maintain processor state). Since leakage power is related to the voltage applied to the part, the C4 state is extremely good at reducing processor power to extremely low levels.

Another technique that mobile computer systems have implemented to save power is to dynamically adjust the frequency and voltage at which the processor operates. For example, operating the processor at a lower frequency and voltage may help reduce processor power consumption. Operating the processor at a lower frequency and voltage may not stop the processor but may change the performance level of the processor. Being able to dynamically adjust the frequency and voltage of the processor allows the processor to be more responsive to events that occur in the computer system. For example, when temperature in the computer system rises to an undesirable level, instead of stopping the processor and causing the computer system to come to a screeching halt, the frequency may be reduced. When the frequency is reduced, the voltage may be reduced. For example, when the performance level of the processor is reduced by 20%, the power consumption of the processor may be reduced by as much as 50%. It's a non-linear trade off of performance versus power. Thus, when the workload is light (e.g., email, word processing, etc.), the processor may run at lower performance and lower voltage, operating at a more efficient level allowing the battery to last longer. Alternatively, when there is an application that requires higher performance, the frequency and voltage may be dynamically increased to provide best possible performance at the expense of battery life.

Hyper-Threading Technology (HT) is a technology from Intel® Corporation of Santa Clara, Calif. that enables execution of threads in parallel using a single physical processor. A physical processor refers to a physical processor die, or in the case of the Intel Pentium® 4 Family of processors, a single package. HT incorporates two logical processors on one physical processor die. A logical processor is an independent processor visible to the OS, capable of executing code and maintaining a unique architectural state from other processors in a system. HT is achieved by duplicating the architectural state, with each architecture state sharing one set of processor execution resources.

When a processor supports HT, multiple threads may be executed simultaneously. Because it is unlikely that threads in both logical processors will stall at the same moment, the shared execution unit is more effectively utilized resulting in higher overall performance at a given clock rate. When processors that support HT are implemented in the mobile computer systems, there may be performance and power management issues that need to be addressed.

BRIEF DESCRIPTION OF THE DRAWINGS

The following drawings disclose various embodiments of the present invention for purposes of illustration only and are not intended to limit the scope of the invention.

FIG. 3A is a flow diagram illustrating a synchronization process performed by a first logical processor, according to one embodiment.

FIG. 3B is a flow diagram illustrating a synchronization process performed by a second logical processor, according to one embodiment.

DETAILED DESCRIPTION

In one embodiment, a method for managing performance state of a processor is disclosed. The processor may be a multithreaded processor and may include two or more logical processors. A system management interrupt (SMI) is generated when the operating system (OS) accesses predetermined address ports. Depending on the address port accessed, the performance state of the processor may be adjusted accordingly.

In the following description, for purposes of explanation, numerous specific details are set forth in order to provide a thorough understanding of the present invention. It will be evident, however, to one skilled in the art that the present invention may be practiced without these specific details. In other instances, well-known structures, processes and devices are shown in block diagram form or are referred to in a summary manner in order to provide an explanation without undue detail.

Logical Processors

Figure 1:
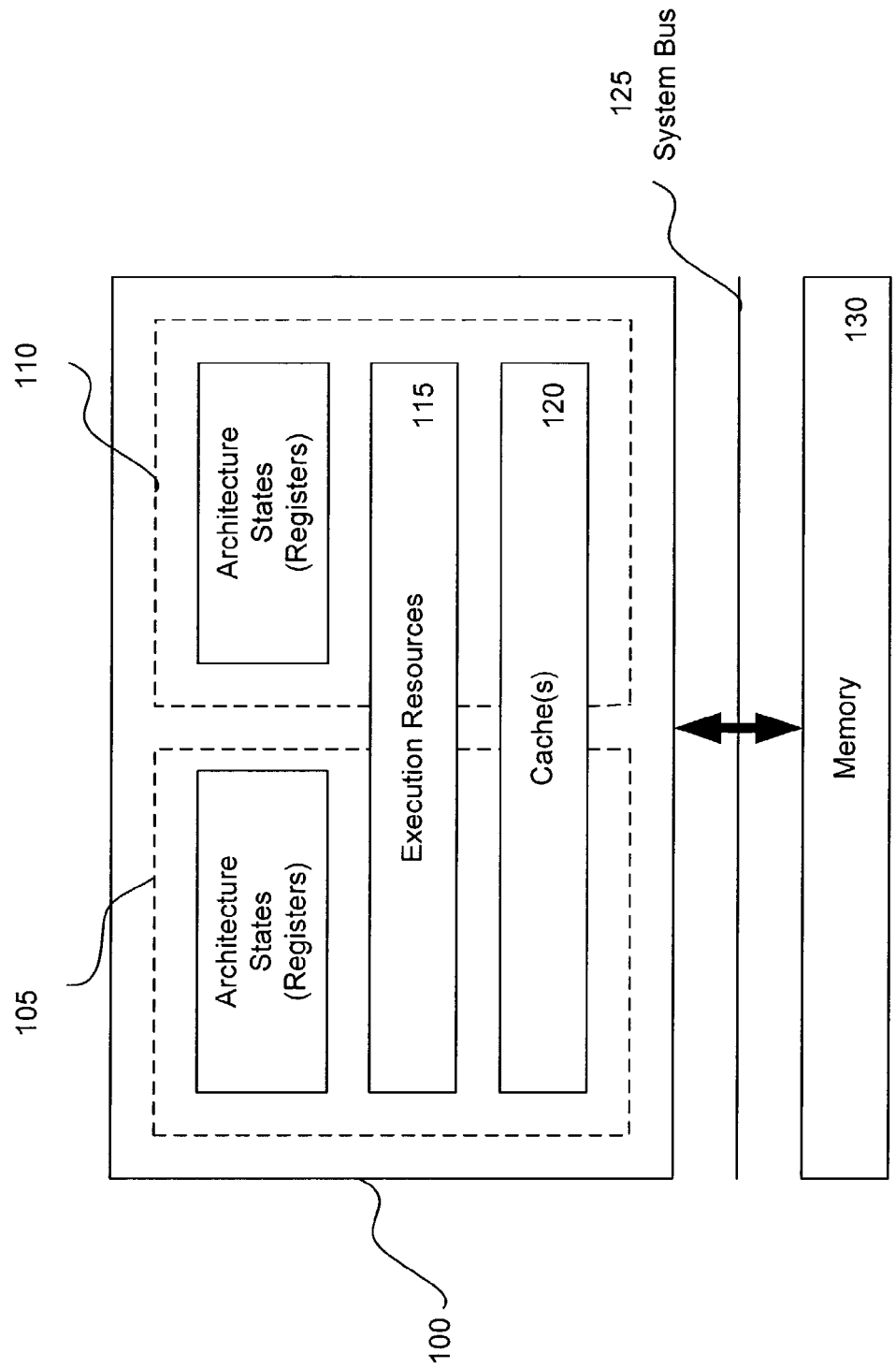
FIG. 1 is a block diagram illustrating an example of a processor that supports multiple logical processors.

FIG. 1 is a block diagram illustrating an example of a processor that supports multiple logical processors. Processor 100 may include two logical processors 105 and 110. For example, the processor 100 may support Hyper-Threading Technology (HT) and may include two architecture states 101 and 102 to make the processor 100 to be perceived as two logical processors 105 and 110. One skilled in the art may recognize that the physical processor may support more than two logical processors, with each being associated with one architecture state. The two logical processors 105 and 110 share the same execution resources 115, caches 120, system bus 125 and main memory 130. The physical processor 100 may schedule the threads in interleaved fashion depending on which of the logical processors 105 and 110 is available. It may be possible that, for example, the logical processor 110 is in the C0 state while the logical processor 105 is in the C1 state, or both in the C0 state, or both in the C1 state. When one logical processor is in the C1 state, the shared execution resources 115 may be freed up for the other non-idle logical processor to use.

Figure 2:
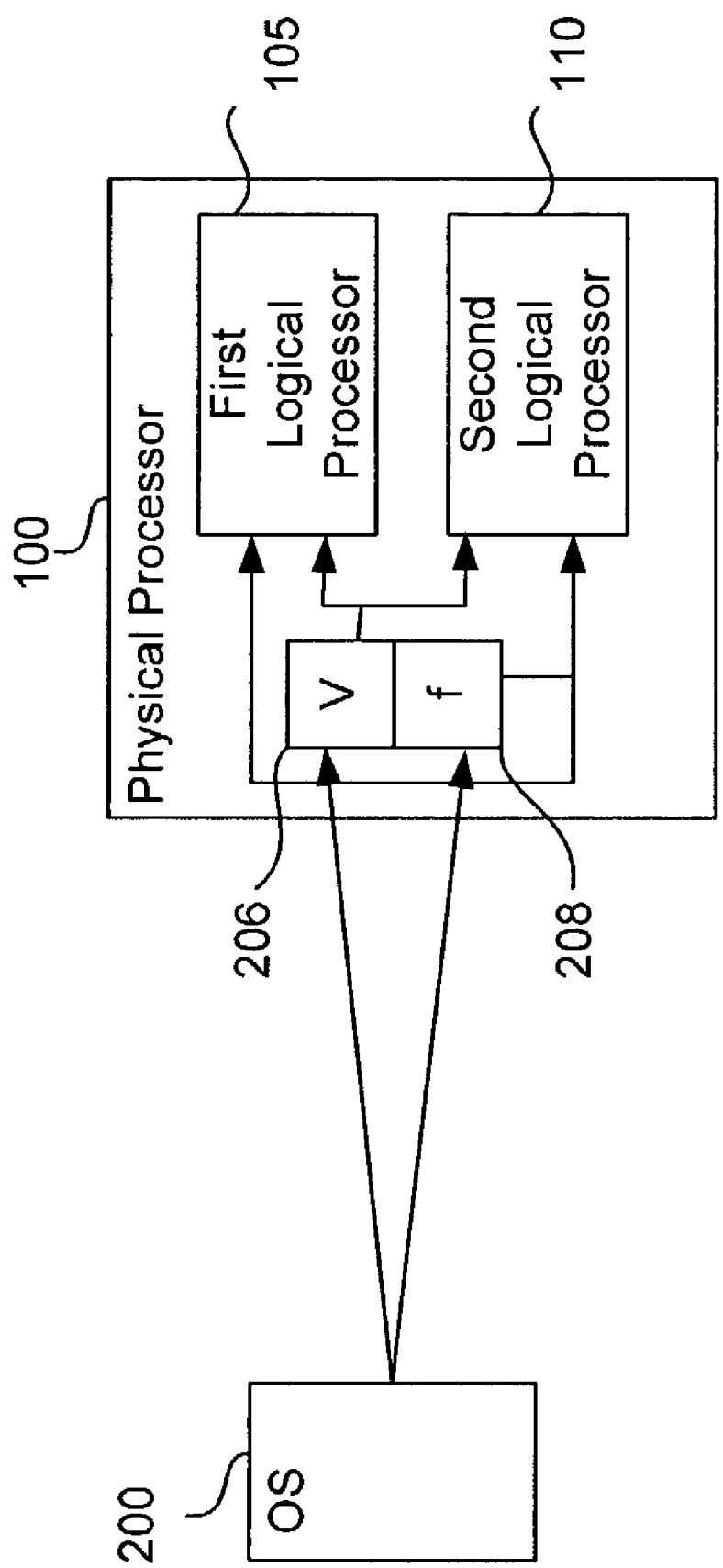
FIG. 2 is a block diagram illustrating an example of how current shipping operating systems operate when using with a processor that supports multiple logical processors.

Typically, current shipping operating systems operate based on the assumption that the system is a multiprocessor system rather than a system with a single physical processor having multiple logical processors. FIG. 2 is a block diagram illustrating an example of how operating systems operate when using with a processor having multiple logical processors. Currently shipping operating systems (e.g., Windows XP and Windows 2000 products from Microsoft Corporation of Redmond, Wash.) that support multi-processors may be designed to work with multiple physical processors. These operating systems may assume that each of the processors in the system is an independent entity that may be managed separately. They expect that each physical processor contains only a single logical processor and manages the performance of the physical processor without taking into account the states of the individual logical processors in the physical processor. For example, referring to FIG. 2, the OS 200 may assume that whenever it does an operation on one physical processor 100 (in a multiprocessor system), that operation has no effect on the other physical processor. Today's OSes are symmetrical in that they assume the processors are functionally equivalent, and an operation performed on one does not affect the other. Because the logical processors 105 and 110 are on the same die sharing common voltage rails 206 and internal clocks 208, independently changing the performance state of each logical processor may not be possible. Any change to the performance state of one logical processor may affect the performance state of the other logical processors.

System Management Mode (SMM)

For one embodiment, the logical physical processors 105 and 110 illustrated in FIG. 1 may support system management mode (SMM) for power management. SMM provides an environment for executing power management software routines or handlers that do not interfere with the OS or application programs. SMM may be entered by generating an SMI service request (referred to herein as SMI) using hardware or software. For example, when an SMI is sent to the logical processor 105, the logical processor 105 enters SMM and executes a SMM software routine in SMRAM address space to service the request associated with the SMI. An SMRAM address space is a memory address space that may be separate from the memory 130. The SMRAM address space may be provided on the physical processor 100 and may be used for storage and execution of SMM software routines. The SMRAM address space may be distinct from the memory 130 to ensure that the software routines running in SMM do not conflict with the OS or application software. SMM is known to one skilled in the art.

For one embodiment, in a processor that supports multiple logical processors (e.g., processors that support HT such as the processor 100 illustrated in FIG. 1), when a SMI is generated, both logical processors 105 and 110 may enter the SMM regardless of which of the logical processors 105 and 110 the SMI is sent to. The logical processors 105 and 110 may share the same SMRAM but may use a different area of SMRAM. For example, when the OS requires service from a software routine in the SMRAM associated with the logical processor 105, the OS may cause a SMI to be sent to the logical processor 105. OS execution may then be suspended. The logical processor 105 may then enter SMM. The logical processor 110 may also enter SMM. The logical processor 105 may then execute a software routine corresponding to the SMI in its SMRAM to service the request. The logical processor 105 may then exit the SMM. Exit from the SMM may be performed when the logical processor 105 executes a RSM (Resume) instruction. The logical processor 110 may also exit from the SMM. The OS execution may then continue.

Processor Synchronization

For one embodiment, synchronization may be performed to ensure that both logical processors 105 and 110 enter and exit SMM at the same time. When an SMI is generated, it may be sent to all processors (logical and/or physical). FIGS. 3A and 3B illustrate an example of synchronization processes according to one embodiment. When the first logical processor enters SMM, the first logical processor may have its instruction pointer (IP) pointing to an SMRAM base address, which may be a dedicated vector within the first logical processor.

Referring to FIG. 3A, upon entering SMM at block 305, the first logical processor (e.g., processor 105) may wait for the second logical processor (e.g., processor 110) to enter SMM. The first logical processor may wait in a loop until it receives a notification from the second logical processor that the second logical processor enters SMM, as shown in block 315. When the notification is received, the first logical processor may proceed with the execution of the software routine to process the SMI, as shown in block 320. It may be noted that this software routine may verify the performance states of both the first logical processor and the second logical processor to determine if they need to be updated (e.g., increase or decrease). Although not shown here, the software routine may also perform further tasks (e.g., comparing a desired performance state with a current performance state, etc.). When these tasks are completed, the process in FIG. 3A flows from block 320 to block 325 where the first logical processor notifies the second logical processor that it is about to exit SMM. At block 330, the first logical processor executes an instruction (e.g., resume) to exit SMM.

Referring to FIG. 3B, when the first logical processor enters SMM, the second logical processor also enters SMM, as shown in block 350. At block 355, the second logical processor notifies the first logical processor that it is in SMM. The second logical processor may wait for the first logical processor to notify when the first logical processor exits SMM. The second logical processor may wait in a loop until the notification is received from the first logical processor, as shown in block 365. When the notification is received from the first logical processor, the process in FIG. 3B flows from block 365 to block 370 where the second logical processor executes an instruction (e.g., resume) to exit SMM. The dotted line connecting block 355 of FIG. 3B to FIG. 3A illustrates an example of the notification sent by the second logical processor to the first logical processor. Similarly, the dotted line connecting block 325 of FIG. 3A to FIG. 3B illustrates an example of the notification sent by the first logical processor to the second logical processor.

Status Port and Update Port

For one embodiment, an SMI trap is generated when a logical processor executes an I/O instruction that accesses a specific I/O port. For example, a system basic input/output system (BIOS) associated with the physical processor 100 may be configured to enable an SMI to be generated. When the logical processor executes the I/O instruction that accesses a specific I/O port (or register address), the system BIOS recognizes that the I/O port is one of the specific ports used to get a performance state status or to control the performance state and causes the SMI to be generated. The SMI enables the logical processors 105 and 110 to enter SMM while the OS sits on the I/O instruction waiting for the service for the SMI to complete. This allows the SMI to create virtual I/O ports in the computer system. While the SMI is being serviced, OS execution may be suspended. The OS state may be saved before entering SMM, and may be restored after exiting from SMM. OS execution may then resume at a next instruction. Other methods may also be used to generate an SMI. Using the I/O instruction described here may be advantageous because it may require only minimal change to the OS.

For one embodiment, a specific status port may be read when the OS wants to find out the performance state of a logical processor, and a specific update port may be written with a desired performance state when the OS wants to update the performance state of the logical processor. Alternatively, the same port may be used for both purposes. For example, when the OS issues an I/O instruction to read from the status port, a performance state of the logical processor is returned. This may be a performance state that the OS may expect to be returned. As will be described later, the performance state returned to the OS may or may not be a performance state that the logical processor may actually be operating at. When the OS issues an I/O instruction to write to the update port, the performance state of the logical processor may be modified based on the desired performance state provided with the I/O instruction. As will be described later, the desired performance state provided by the OS may or may not be used to change a performance state that the logical processor may actually be operating at.

Virtual and Actual Performance State Registers

For one embodiment, two sets of registers may be used to store performance states of the logical processors. The registers may be memory locations in the SMRAM and may be accessed when the logical processors enter the SMM. One set of registers may be associated with the first logical processor 105, and the other set of registers may be associated with the second logical processor 110. Each set of registers may include a virtual performance state register. The virtual performance state register may be used to store a performance state that may be known to the OS. This may be referred to as a virtual performance state.

Each set of registers may also include an actual or physical performance state register. The actual performance state register may be used to store a performance state that the logical processor may actually be operating at. This may be referred to as an actual or physical performance state. It may be noted that the virtual performance state and the actual performance state for a logical processor may or may not be similar. Having the virtual performance state register and the actual performance state register may enable the OS to think that it can independently manage the performance states of each of the logical processors.

Retrieving Performance State

Figure 4:
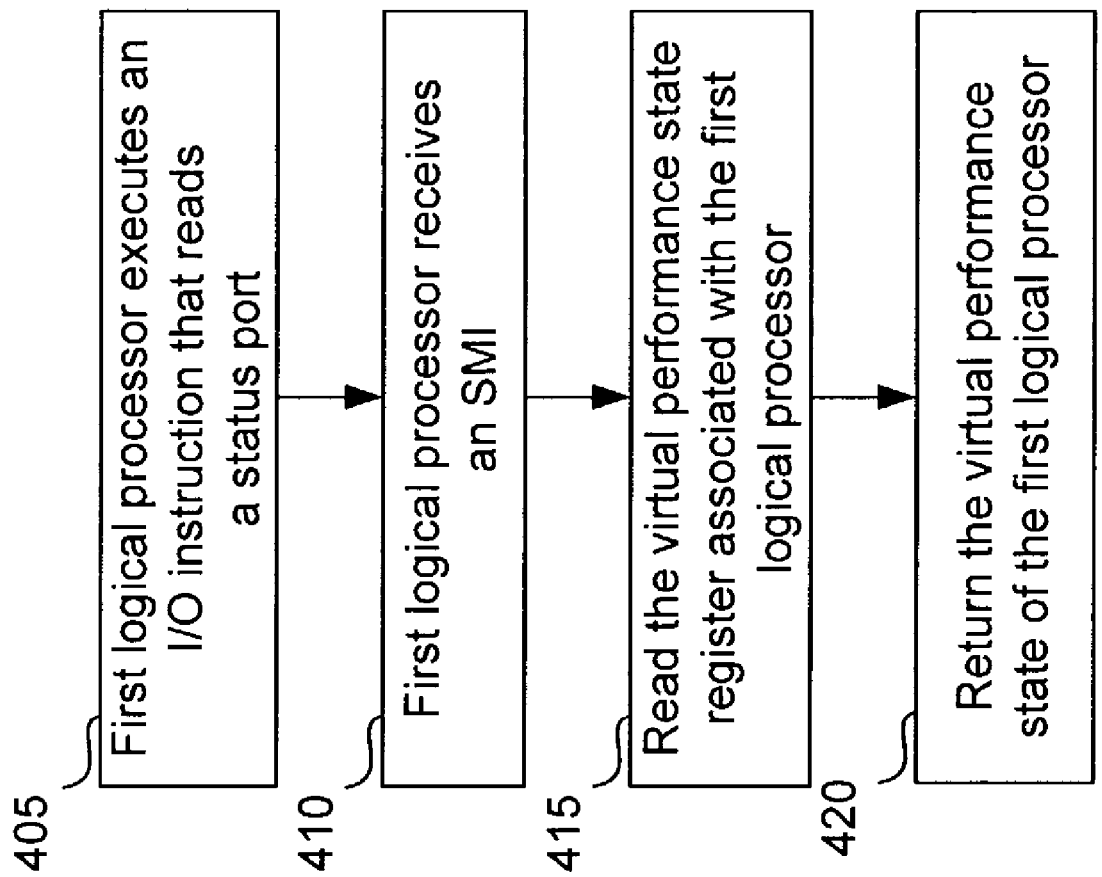
FIG. 4 is a flow diagram illustrating an example of a process used to retrieve the performance state of a logical processor, according to one embodiment.

FIG. 4 is a flow diagram illustrating an example of a process used to retrieve the performance state of a logical processor, according to one embodiment. For one embodiment, whenever the OS requests for a performance state of a logical processor, the virtual performance state of that logical processor is returned. At block 405, the first logical processor executes an I/O instruction that reads the status port. Reading the status port may cause an SMI to be generated, as shown in block 410. At this time, all of the logical processors in the physical processor may enter SMM. While in SMM, a software routine associated with the SMI may run to determine which of the logical processors receives the SMI. This may be done by examining the last instruction that the logical processor executes and identifying that the last instruction is an I/O instruction and that its operand indicates the status port. In this example, when the software routine identifies the logical processor that receives the SMI is the first logical processor, the software routine may access the virtual performance state register associated with the first logical processor to retrieve the virtual performance state, as shown in block 415. At block 420, the virtual performance state of the first logical processor is returned.

Updating Performance State

Figure 5:
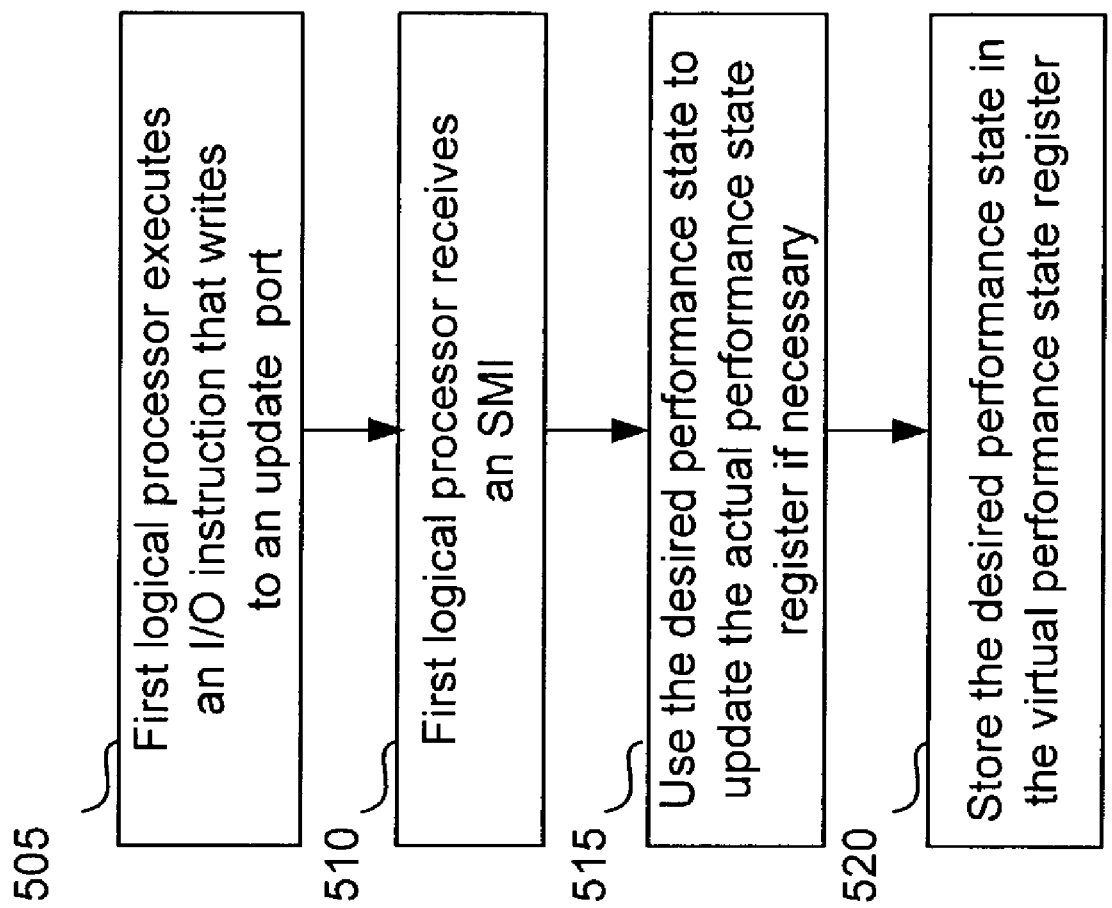
FIG. 5 is a flow diagram illustrating an example of a process used to update the performance state of a logical processor, according to one embodiment.

FIG. 5 is a flow diagram illustrating an example of a process used to update the performance state of a logical processor, according to one embodiment. At block 505, the first logical processor executes an I/O instruction that writes a desired performance state to the update port. Writing to the update port may cause an SMI to be generated, as shown in block 510. At this time, all of the logical processors in the physical processor may enter SMM. When in SMM, a software routine associated with the SMI may need to determine which of the logical processors received the SMI.

This may be performed by examining a last instruction that each of the logical processors executed. In this example, when the software routine identifies the logical processor that receives the SMI is the first logical processor, the software routine may access the virtual performance state register associated with the first logical processor to determine if the I/O instruction wants to increase or to decrease the performance state of the first logical processor.

At block 515, the software routine may store the desired performance state into the actual performance state register associated with the first logical processor, if necessary. This will be described in more detail in connection with FIG. 6. As described above, the actual performance state register may indicate a performance state that the first logical processor may actually be operating at. Thus, when the desired performance state is stored into the actual performance state register, the performance state that the first logical processor is operating at may be updated. At block 520, the software routine may then store the desired performance state in the virtual performance state register.

Performance Synchronization Policy

Figure 6:
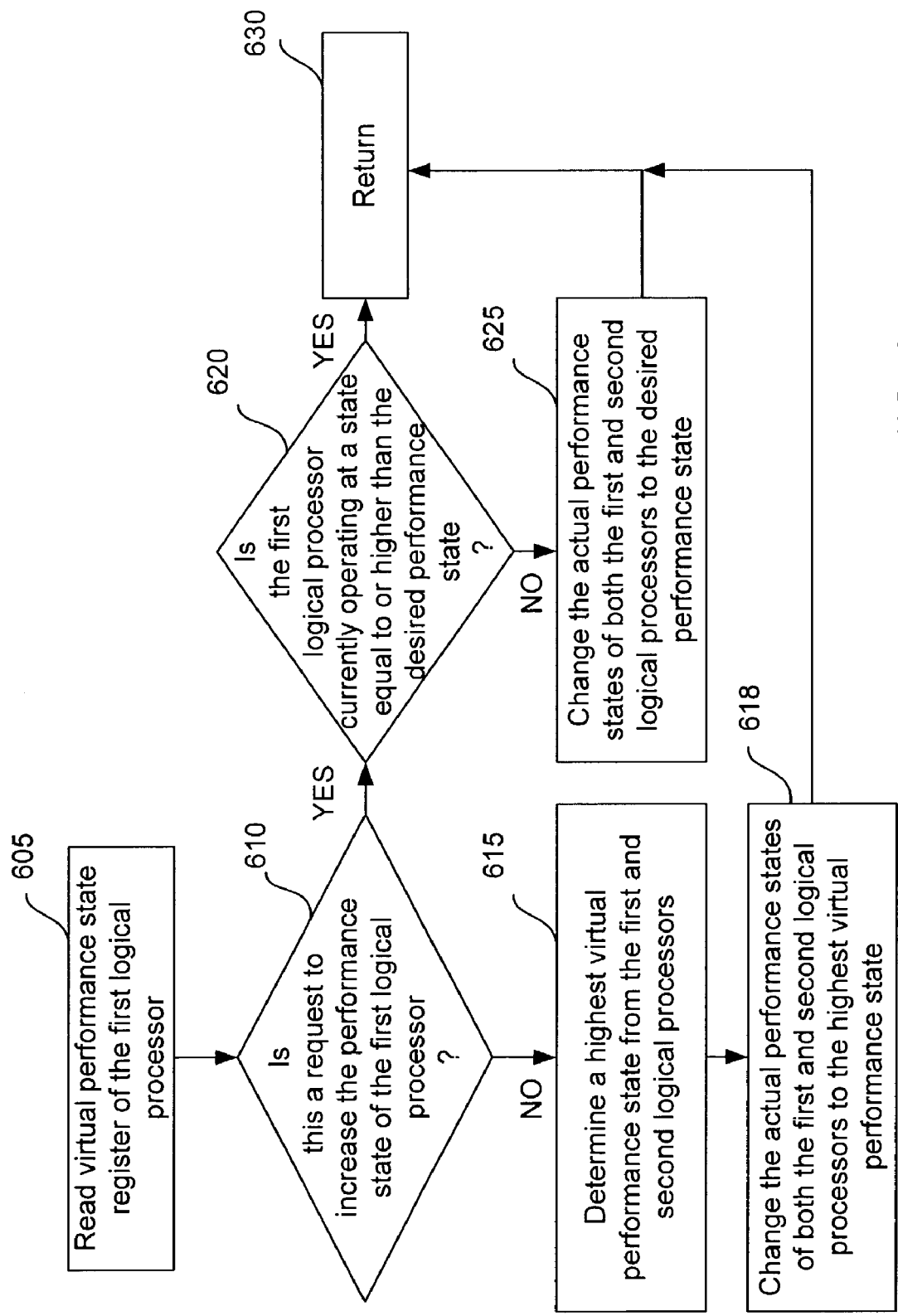
FIG. 6 is a block diagram illustrating an example of a synchronization policy, according to one embodiment.

For one embodiment, to perform the operation in block 515 of FIG. 5, a performance synchronization policy may be used by the software routine to determine whether to write the desired performance state into the actual performance state register. FIG. 6 is a block diagram illustrating an example of a performance synchronization policy, according to one embodiment. The synchronization policy may be used to allow the OS to think that it can independently manipulate the performance states of the logical processors.

For one embodiment, the performance synchronization policy may err on the higher actual performance state. That is, the synchronization policy may agree to allow a logical processor to operate at an actual performance state that is higher than what the OS thinks that logical processor is operating at.

For one embodiment, the physical processor may operate at a performance state that is equal to the actual performance state of the logical processors. Thus, it may be possible that the physical processor may be operating at a higher performance state than the performance state that the OS thinks one or more of the logical processors are operating at.

It may be possible that the actual performance state and the virtual performance state of one of the logical processors may be the same. Furthermore, it may be possible for the virtual performance state of a logical processor to be lower or equal to the actual performance state of that logical processor. However, it may not be possible for the virtual performance state of a logical processor to be higher than the actual performance state of that logical processor.

Referring to the example in FIG. 6, when the OS wants to change the performance state of the first logical processor, it writes a desired performance state to the update port. At block 605, the virtual performance state of the first logical processor may be retrieved from the virtual performance state register associated with the first logical processor. At block 610, a software routine associated with the SMI may run. The software routine may compare the desired performance state with the virtual performance state (as stored in the virtual performance state register) of the first logical processor to determine if the instruction is a request to increase or to decrease the performance state of the first logical processor.

When it is an increase request (i.e., the desired performance state is higher than the virtual performance state as stored in the virtual performance state register), the process flows from block 610 to block 620. At block 620, the software routine may compare the desired performance state with the actual performance state (as stored in the actual performance state register) of the first logical processor. When the first logical processor is already operating at a performance state that is equal to or higher than the desired performance state, it may not be necessary to change the actual performance state of the first logical processor. The desired performance state may then be stored in the virtual performance state register associated with the first logical processor. This desired performance state becomes the new virtual performance state that the OS thinks the first logical processor is operating at. The process then flows from block 620 to block 630.

From block 620, when the request is to increase the performance state of the logical processor, and the first logical processor is currently operating at a performance state that is lower than the desired performance state, the process flows to block 625. At block 625, the actual performance state of the first logical processor is updated to the desired performance state. This may include writing the desired performance state to the actual performance state register. In addition, the actual performance states of all of the other logical processors may also be updated to the desired performance state. It may be noted that in this situation, except for the virtual register state associated with the first logical processor, the virtual register states associated with of all of the logical processors may remain unchanged. The process then flows from block 625 to block 630.

From block 610, when it is a request to decrease (i.e., the desired performance state is lower than the virtual performance state as stored in the virtual performance state register), the process flows from block 610 to block 615 where a highest virtual performance state of all the logical processors is determined. For example, all of the other logical processors may have requested to operate at a low performance state (as indicated by their virtual performance state registers), but they may all be running at a higher actual performance state similar to the actual performance state that the first logical processor is operating at. Thus, when the request to decrease is received, it may be possible to reduce the actual performance state of all of the logical processors (and therefore the physical processor), as shown in block 618. It may be noted that in this situation, except for the virtual register state associated with the first logical processor, the virtual register states associated with of all of the logical processors may remain unchanged. The process then flows from block 618 to block 630.

It may be noted that the performance synchronization policy described above in FIG. 6 is a performance-oriented policy that may err on the side of higher performance because the selection is made based on the highest virtual performance state (block 618) or the highest actual performance state (block 625) of the two logical processors. Alternatively, other more conservative performance synchronization policy may also be used. For example, to achieve longer battery life, the performance synchronization policy may err on the side of lower performance. For one embodiment, the selection may be made based on the lowest virtual or actual performance state of the two logical processors. For another embodiment, the selection may be made based on a weighted average of the performance states of the two logical processors. For example, if the first logical processor's actual performance state is to be at 1 GHz and if the second logical processor's actual performance state is to be at 2 GHz, both logical processors may be set to operate at 1.6 GHz to still deliver a slightly higher performance for the first logical processor but to save some power for the second logical processor.

Figure 7:
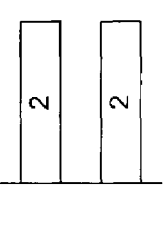
FIG. 7 is a block diagram illustrating an example of virtual performance states and actual performance states of logical processors in a physical processor, according to one embodiment.

FIG. 7 is a block diagram illustrating an example of virtual performance states and actual performance states of two logical processors in a physical processor, according to one embodiment. The diagram is illustrated based on the performance synchronization policy of FIG. 6. At time T0, on the left column, the virtual performance state (as indicated by the virtual performance state register) of the first logical processor indicates that it is operating at 1 GHz, and the virtual performance state of the second logical processor indicates that it is operating at 2 GHz. Meanwhile, on the right column, the actual performance state of the first logical processor (as indicated by the actual performance state register) indicates that the first logical processor is actually operating at 2 GHz. Similarly, the actual performance state of the second logical processor indicates that the second logical processor is actually operating at 2 GHz. In this situation, the physical processor may be operating at 2 GHz.

At time T1, the OS may issue an I/O instruction that writes to the update port to increase the performance state of the first logical processor to 1.5 GHz. Since the actual performance state of the first logical processor is at 2 GHz, which is a higher performance state, the actual performance state of the first logical processor may not need to be updated. Because the virtual performance state of the first logical processor is a performance state that may be known to the OS, the virtual performance state of the first logical processor is increased to the same performance state (e.g., 1.5 GHz) expected by the OS. It may be noted that the actual performance state of both the first and second logical processors are at 2 GHz. In this situation, the physical processor may be operating at 2 GHz.

At time T2, the OS may issue an I/O instruction that writes to the update port to increase the performance state of the second logical processor to 2.5 GHz. Since the actual performance state of the second logical processor is currently at 2 GHz, which is a lower performance state, the actual performance state of the second logical processor may be increased to 2.5 GHz. The virtual performance state register of the second logical processor is also increased to the same performance state (e.g., 2.5 GHz) expected by the OS. Because the synchronization policy described in FIG. 6 may err on a higher actual performance state, the actual performance state of the first logical processor may also be changed to 2.5 GHz, even though its virtual performance state may remain the same at 1.5 GHz. In this case, the physical processor may be operating at 2.5 GHz.

At time T3, the OS may issue an I/O instruction that writes to the update port to decrease the performance state of the first logical processor to 0.75 GHz. Because the actual performance state of the second logical processor is at 2.5 GHz, and because the synchronization policy allows erring on a higher performance state, the actual performance state of the first logical processor may not be changed to 0.75 GHz but may remain at 2.5 GHz. The virtual performance state register of the first logical processor may be changed to the performance state (e.g., 0.75 GHz) expected by the OS. There is no change to the actual performance state and the virtual performance state of the second logical processor. In this case, the physical processor may be operating at 2.5 GHz.

At time T4, the OS may issue an I/O instruction that writes to the update port to decrease the performance state of the second logical processor to 0.5 GHz. Since the first second logical processor has the highest virtual performance state at 0.75 GHz (as compared to 0.5 GHz for the second logical processor), the actual performance state of the first logical processor and the second logical processor may be decreased to 0.75 GHz. The virtual performance state of the second logical processor may be decreased to a performance state (e.g., 0.5 GHz) expected by the OS. There is no change to the virtual performance state of the first logical processor, and it remains at 0.75 GHz. The physical processor may be operating at 0.75 GHz.

Computer Readable Media

The operations of these various methods may be implemented by a processor that supports multiple logical processors in a computer system, which executes sequences of computer program instructions that are stored in a memory that may be considered to be a machine-readable storage media. The memory may be random access memory, read only memory, a persistent storage memory, such as mass storage device or any combination of these devices. Execution of the sequences of instruction may cause the processor to perform operations according to the processes described in FIGS. 4–6, for example.

The instructions may be loaded into memory of the computer system from a storage device or from one or more other computer systems (e.g. a server computer system) over a network connection. The instructions may be stored concurrently in several storage devices (e.g. DRAM and a hard disk, such as virtual memory). Consequently, the execution of these instructions may be performed directly by the processor.

In other cases, the instructions may not be performed directly or they may not be directly executable by the processor. Under these circumstances, the executions may be executed by causing the processor to execute an interpreter that interprets the instructions, or by causing the processor to execute a compiler which converts the received instructions to instructions that which can be directly executed by the processor.

In other embodiments, hard-wired circuitry may be used in place of or in combination with software instructions to implement the present invention. Thus, the present invention is not limited to any specific combination of hardware circuitry and software, nor to any particular source for the instructions executed by the computer system.

Methods and systems for placing processors that support multiple logical processors (e.g., processors that support HT) into lower power states have been disclosed. By using SMM, the performance states of each of the logical processors may be managed. Although the present invention has been described with reference to specific exemplary embodiments, it will be evident that various modifications and changes may be made to these embodiments without departing from the broader spirit and scope of the invention as set forth in the claims. For example, although processors supporting HT are described as having two logical processors, the techniques described may also be applicable when there are more than two logical processors. Accordingly, the specification and drawings are to be regarded in an illustrative rather than a restrictive sense.

What is claimed is:

1. A method, comprising:
using system management interrupt (SMI) to manage a virtual performance state of a first logical processor and an actual performance state of the first logical processor, wherein the first logical processor is associated with a physical processor having two or more logical processors, wherein the actual performance state that the first logical processor is to operate at is at least equal to its virtual performance state as reported to an operating system (OS), and wherein the actual performance state of the first logical processor is selected based on a highest actual performance state of the two or more logical processors.

2. The method of claim 1, wherein the actual performance state of the first logical processor is selected based on a highest virtual performance state of the two or more logical processors.

3. The method of claim 1, wherein the actual performance state of the first logical processor is selected based on a lowest actual performance state of the two or more logical processors.

4. The method of claim 1, wherein the actual performance state of the first logical processor is selected based on a lowest virtual performance state of the two or more logical processors or based on a weighted average of actual performance states of the two or more logical processors.

5. The method of claim 1, wherein the physical processor is to operate at the actual performance state of the first logical processor.

6. A system, comprising:
a physical processor coupled to a memory, the physical processor having a first logical processor and a second logical processor, wherein performance states of the first logical processor and of the second logical processor are managed by generating a system management interrupt (SMI) and by using system management mode (SMM), wherein a virtual performance state of the first logical processor is a performance state reported to an operating system (OS), wherein an actual performance state of the first logical processor is a performance state that the first logical processor is actually operating at, and wherein the actual performance state of the first logical processor is determined based on a highest actual performance state of the first and the second logical processors.

7. A computer readable storage medium containing executable instructions which, when executed in a processing system, causes the processing system to perform a method comprising:
using system management interrupt (SMI) to retrieve a virtual performance state of a first logical processor and to change the virtual performance state of the first logical processor, wherein the first logical processor is associated with a physical processor having two or more logical processors, wherein an actual performance state of the first logical processor is at least equal to its virtual performance state, the virtual performance state being a state reported to an operating system (OS), the actual performance state being a state the first logical processor is actually operating at, wherein when the actual performance state of the first logical processor is less than the virtual performance state of the first logical processor, the actual performance state of the first logical processor is changed to be equal to its virtual performance state, and wherein when the actual performance state of the first logical processor is changed to be equal to its virtual performance state, actual performance states of all other logical processors are also changed to be equal to the virtual performance state of the first logical processor.

8. The computer readable storage medium of claim 7, wherein the actual performance state of the first logical processor is changed when the virtual performance state of the first logical processor is decreased.

9. The computer readable storage medium of claim 8, wherein the actual performance state of the first logical processor is changed to a highest virtual performance state of all the logical processors.

10. The computer readable storage medium of claim 9, wherein actual performance states of all other logical processors are changed to the highest virtual performance state.

* * * * *